(12) United States Patent
Hong et al.

(10) Patent No.: US 9,592,174 B2
(45) Date of Patent: Mar. 14, 2017

(54) EXOSKELETON MECHANISM FOR JOINT MOVEMENT ASSISTANCE

(75) Inventors: Manbok Hong, Seoul (KR); Keehoon Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 1010 days.

(21) Appl. No.: 13/617,985

(22) Filed: Sep. 14, 2012

(65) Prior Publication Data

US 2013/0090580 A1   Apr. 11, 2013

(30) Foreign Application Priority Data

Oct. 5, 2011   (KR) .................. 10-2011-0101430

(51) Int. Cl.
*A61H 1/02*   (2006.01)
*B25J 9/00*   (2006.01)

(52) U.S. Cl.
CPC .......... *A61H 1/0277* (2013.01); *B25J 9/0006* (2013.01); *B25J 9/0072* (2013.01); *A61H 2201/1215* (2013.01); *A61H 2201/149* (2013.01); *A61H 2201/165* (2013.01); *A61H 2201/5007* (2013.01); *A61H 2201/5061* (2013.01)

(58) Field of Classification Search
CPC .......... A61H 1/00; A61H 1/02; A61H 1/0274; A61H 1/0277; A61H 1/0285; A61H 1/0288; A61H 1/0262; A61H 1/0266
USPC ..................................................... 623/57–62
See application file for complete search history.

(56) References Cited

U.S. PATENT DOCUMENTS 4,521,924 A * 6/1985 Jacobsen ............... A61F 2/58
623/20.11
5,067,479 A * 11/1991 Saringer .............. A61H 1/0285
601/40
(Continued)

FOREIGN PATENT DOCUMENTS

JP   2007-29113    2/2007
KR   10-1065420   9/2011

OTHER PUBLICATIONS

Gupta, Abhishek, et al., "Robotic Exoskeletons for Upper Extremely Rehabilitation," Rehabilitation Robotics, Sashi S Kommu (Ed.), Aug. 2007, pp. 371-396, ISBN: 978-3-902613-04-2, InTech, Available from: <http://www.intechopen.com/books/rehabilitation_robotics/robotic_exoskeletons_for_upper_extremity_rehabilitation>.

*Primary Examiner* — Justine Yu
*Assistant Examiner* — Kathrynn Lyddane
(74) *Attorney, Agent, or Firm* — NSIP Law

(57) ABSTRACT

An exoskeleton mechanism according to the present disclosure includes: a fixed frame positioned to correspond to an upper physique; a rotatable frame positioned to correspond to a lower physique and coupled to the fixed frame by a hinge unit to be rotatable in the vertical direction; a support frame for supporting a terminal; a first motor mounted to the fixed frame and connected to the rotatable frame to drive the rotatable frame to rotate in the vertical direction; motors mounted to the rotatable frame and connected to the support frame to drive the support frame to rotate in the vertical direction and in the horizontal direction and rotate around an axis (roll axis) of the lower physique; links for connecting the first motor and the rotatable frame; and links for connecting the motors and the support frame.

12 Claims, 16 Drawing Sheets

(56) References Cited

U.S. PATENT DOCUMENTS

| | | | |
|---|---|---|---|
| 7,618,381 B2 * | 11/2009 | Krebs | A61H 1/0285 601/5 |
| 2002/0177905 A1 * | 11/2002 | Yih | A61F 2/54 623/24 |
| 2009/0326422 A1 * | 12/2009 | Hoffman | A61H 1/0277 601/5 |
| 2010/0038983 A1 * | 2/2010 | Bhugra | A61F 2/68 310/83 |
| 2010/0204804 A1 * | 8/2010 | Garrec | A61H 1/0277 623/24 |
| 2010/0249948 A1 * | 9/2010 | Kawakami | A61F 5/013 623/26 |
| 2012/0179075 A1 * | 7/2012 | Perry | B25J 9/0006 601/33 |

* cited by examiner

EXOSKELETON MECHANISM FOR JOINT MOVEMENT ASSISTANCE

CROSS-REFERENCE TO RELATED APPLICATION

This application claims priority to Korean Patent Application No. 10-2011-0101430, filed on Oct. 5, 2011, and all the benefits accruing therefrom under 35 U.S.C. §119, the contents of which in its entirety are herein incorporated by reference.

BACKGROUND

1. Field

The present disclosure relates to an exoskeleton mechanism, and more particularly, to an exoskeleton mechanism for assisting joint movement of a human or a robot (a "wearer").

2. Description of the Related Art

An exoskeleton mechanism is mounted to an arm or leg of a patient, who feels inconvenience in the limb, to assist in or reinforce the muscular power of the patient or mounted to a robot so that a joint of the robot generates a force over a designed torque.

The exoskeleton mechanism is configured so that a frame corresponding to a physique of the limb (hereinafter, generally referred to as an "arm") of the wearer allows the muscle of the arm to smoothly move. The exoskeleton mechanism includes a plurality of frames and links as well as motors required for driving the frames and links so as to make the same movement as the arm.

The exoskeleton mechanism should be configured to ensure convenient wearing and also to allow the wearer to easily take off at emergency. In addition, the exoskeleton mechanism should ensure precise operation and precise detection in order to prevent an impractical force from being applied to the wearer who wears the exoskeleton mechanism.

One of conventional exoskeleton mechanisms for limb power assistance uses a ring-type guide rail, which is not easily worn or taken off by the patient. In addition, due to the use of the ring-type guide rail, the exoskeleton mechanism has a great volume, which may frequently disturb the movement of the patient.

Moreover, since a motor for connecting links is formed to protrude to the side of the frame, the exoskeleton mechanism has a great volume, and designing the exoskeleton mechanism is difficult.

SUMMARY

The present disclosure is directed to provide an exoskeleton mechanism, which may be conveniently worn by a wearer and also be easily taken off.

The present disclosure is also directed to provide an exoskeleton mechanism, which may measure an applied force when a wearer moves the arm.

The present disclosure is also directed to provide an exoskeleton mechanism, which is configured with a dense design where a motor is mounted in the length direction of a frame which supports the arm so as not to protrude to the side of the frame.

In one aspect of the present disclosure, there is provided an exoskeleton mechanism coupled to upper and lower physiques jointed with the single degree of freedom, which includes: a fixed frame positioned to correspond to the upper physique; a rotatable frame positioned to correspond to the lower physique and coupled to the fixed frame by a hinge unit to be rotatable in the vertical direction; a first motor mounted to the fixed frame and connected to the rotatable frame to drive the rotatable frame to rotate in the vertical direction; and links for connecting the first motor and the rotatable frame.

According to an embodiment of the present disclosure, a rotary shaft of the first motor may be positioned in the length direction of the fixed frame.

According to an embodiment of the present disclosure, a driving gear of a rotating power transmission unit between first inclined shafts may be mounted to a rotary shaft of the first motor, a first link may be fixed to a shaft of an interlocking gear which interlocks with the driving gear, an end of a second link may be hinged to an end of the first link, and an end of the second link may be fixed to the hinge unit.

According to an embodiment of the present disclosure, the hinge unit may include a first hinge bracket formed at the fixed frame and a second hinge bracket connected to the rotatable frame to correspond to the first hinge bracket and mounted to a hinge shaft to be relatively rotatable, and a second link may be hinged to the second hinge bracket.

According to an embodiment of the present disclosure, a slide bracket may be formed at the second hinge bracket, an elongated hole may be formed in the slide bracket in the length direction of the rotatable frame, and a slider formed at the rotatable frame may be locked by being inserted into the elongated hole or may be movable in the length direction of the elongated hole in a state where the lock is released.

In another aspect of the present disclosure, there is also provided an exoskeleton mechanism coupled to a lower physique and a terminal jointed with the three-degree of freedom, which includes: a rotatable frame positioned to correspond to the lower physique; a support frame for supporting the terminal; motors mounted to the rotatable frame and connected to the support frame to drive the support frame to rotate in the vertical direction and in the horizontal direction and rotate around an axis (roll axis) of the lower physique; and links for connecting the motors and the support frame.

According to an embodiment of the present disclosure, the motors may include a second motor for driving the support frame to rotate in the horizontal direction, a third motor for driving the support frame to rotate in the vertical direction, and a fourth motor for driving the support frame to rotate around the roll axis, and rotary shafts of the second motor, the third motor and the fourth motor may be respectively positioned in the length direction of the support frame.

According to an embodiment of the present disclosure, a driving gear of a rotating power transmission unit between second inclined shafts may be mounted to a rotary shaft of the second motor, a third link may be fixed to a shaft of an interlocking gear which interlocks with the driving gear, an end of a fourth link may be hinged to an end of the third link, rotating joints may be mounted to both ends of a fifth link, the other end of the fourth link may be hinged to a block of one rotating joint of the fifth link, and a block of the other rotating joint of the fifth link may be fixed to the support frame.

According to an embodiment of the present disclosure, a first guide bar may be fixed to the block of the rotating joint hinged to the other end of the fourth link in the length direction of the rotatable frame, and the first guide bar may be inserted into a first holder fixed to the rotatable frame to make linear movement.

According to an embodiment of the present disclosure, a driving gear of a rotating power transmission unit between third inclined shafts may be mounted to a rotary shaft of the third motor, a sixth link may be fixed to a shaft of an interlocking gear which interlocks with the driving gear, an end of a seventh link may be hinged to an end of the sixth link, rotating joints may be mounted to both ends of an eighth link, the other end of the seventh link may be hinged to a block of one rotating joint of the eighth link, and a block of the other rotating joint of the eighth link may be fixed to the support frame.

According to an embodiment of the present disclosure, a second guide bar may be fixed to the block of the rotating joint hinged to the other end of the seventh link in the length direction of the rotatable frame, and the second guide bar may be inserted into a second holder fixed to the rotatable frame to make linear movement.

According to an embodiment of the present disclosure, a rotating joint may be mounted to an end of the fourth motor, one end of the ninth link may be fixed to the block of the rotating joint, one end of a tenth link may be hinged to the other end of the ninth link, and the other end of the tenth link may be hinged to the support frame.

According to an embodiment of the present disclosure, one end of the ninth link may be fixed to a shaft formed at the block of the rotating joint, and an extension line of the shaft, an extension line of the hinge shaft connecting the ninth link and the tenth link, and an extension line of the hinge shaft connecting the tenth link and the support frame may meet at one point.

According to an embodiment of the present disclosure, the support frame may be curved around the one point.

According to an embodiment of the present disclosure, a grip may be mounted to the support frame so that the grip is gripped by the hand which is a terminal.

According to an embodiment of the present disclosure, a fixing means may be mounted to the support frame so that the foot is fixed by the fixing means.

According to an embodiment of the present disclosure, a flexible hinge serving as an adaptive module may be mounted to the rotary shaft of the first motor.

According to an embodiment of the present disclosure, flexible hinges serving as an adaptive module may be respectively mounted to the rotary shafts of the second motor, the third motor and the fourth motor.

According to an embodiment of the present disclosure, a strain gauge may be mounted to the flexible hinge to measure a stress applied to the flexible hinge.

In another aspect of the present disclosure, there is also provided an exoskeleton mechanism coupled to upper and lower physiques jointed with the single degree of freedom and coupled to the lower physique and a terminal jointed with the three-degree of freedom, which includes: a fixed frame positioned to correspond to the upper physique; a rotatable frame positioned to correspond to the lower physique and coupled to the fixed frame by a hinge unit to be rotatable in the vertical direction; a support frame for supporting the terminal; a first motor mounted to the fixed frame and connected to the rotatable frame to drive the rotatable frame to rotate in the vertical direction; motors mounted to the rotatable frame and connected to the support frame to drive the support frame to rotate in the vertical direction and in the horizontal direction and rotate around an axis (roll axis) of the lower physique; links for connecting the first motor and the rotatable frame; and links for connecting the motors and the support frame.

As described above, in the exoskeleton mechanism according to the present disclosure, driving motors are mounted to bottom surfaces of a fixed frame and a rotatable frame, and the rotary shafts of the driving motors are positioned in the length direction of the fixed frame or the rotatable frame. In other words, since no motor protrudes to the side of the exoskeleton mechanism, the entire configuration of the exoskeleton mechanism may be configured with a dense design, and the exoskeleton mechanism does not disturb the movement of a wearer.

In addition, since the exoskeleton mechanism according to the present disclosure is configured so that the limb may be placed on the fixed frame, the rotatable frame and a support frame, the wearer may rapidly move the limb out of the exoskeleton mechanism at emergency.

Moreover, the exoskeleton mechanism according to the present disclosure includes an adaptive module mounted to the rotary shaft of the motor to buffer an excessive force and thus protect the wearer, and a strain gauge may be mounted to the adaptive module to calculate the force.

Further, in the exoskeleton mechanism according to the present disclosure, since links and fixed brackets are positioned at both sides of the fixed frame, the upper arm may be stably supported. Therefore, when a wearer moves the arm by using the exoskeleton mechanism, it is possible to prevent the arm from falling out of the fixed frame.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION

Hereinafter, an exemplary embodiment of an exoskeleton mechanism according to the present disclosure will be described in detail with reference to the accompanying drawings.

Figure 1:
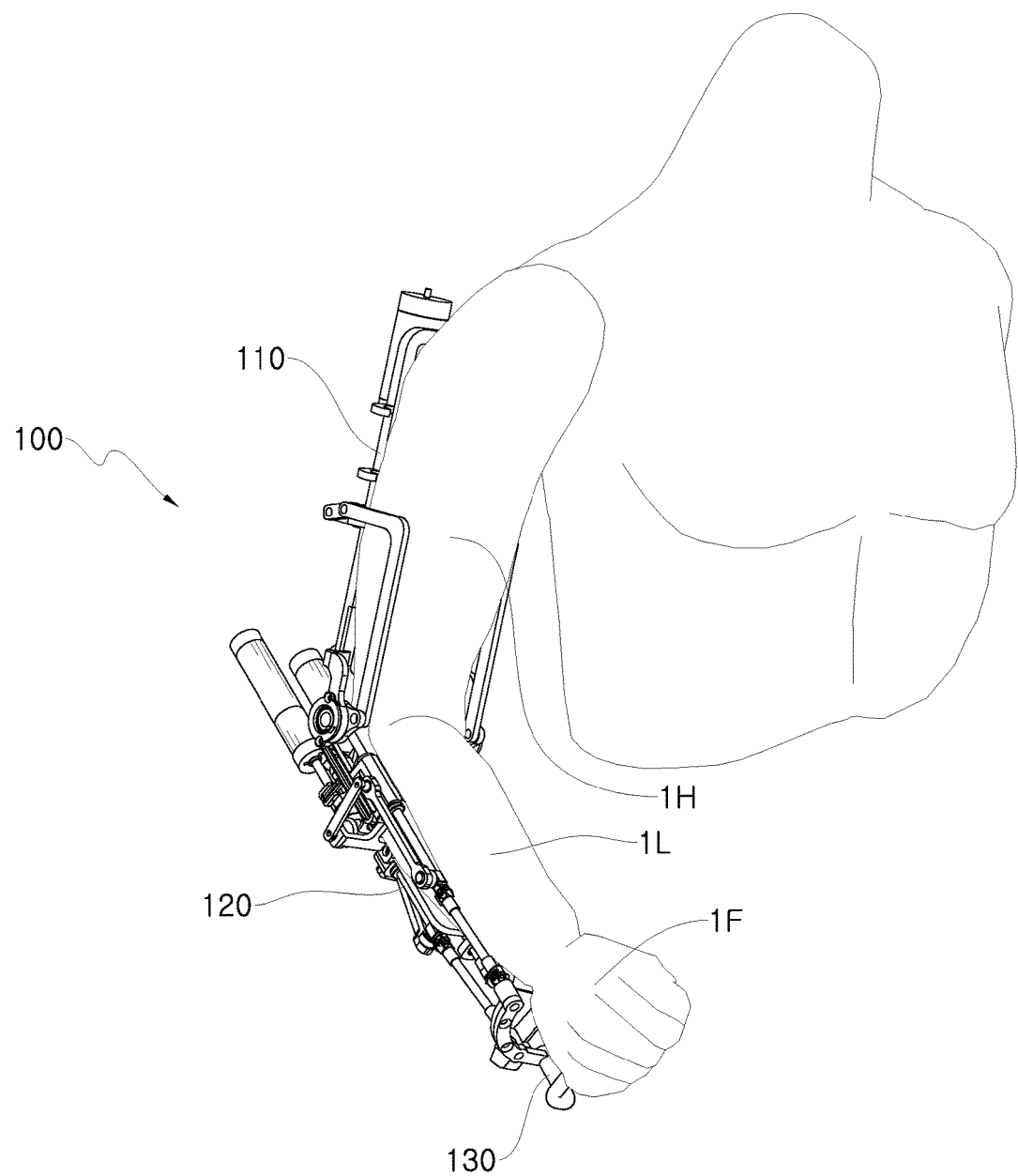
FIG. 1 is a perspective view showing an exoskeleton mechanism worn by a user according to an embodiment of the present disclosure.
Figure 2:
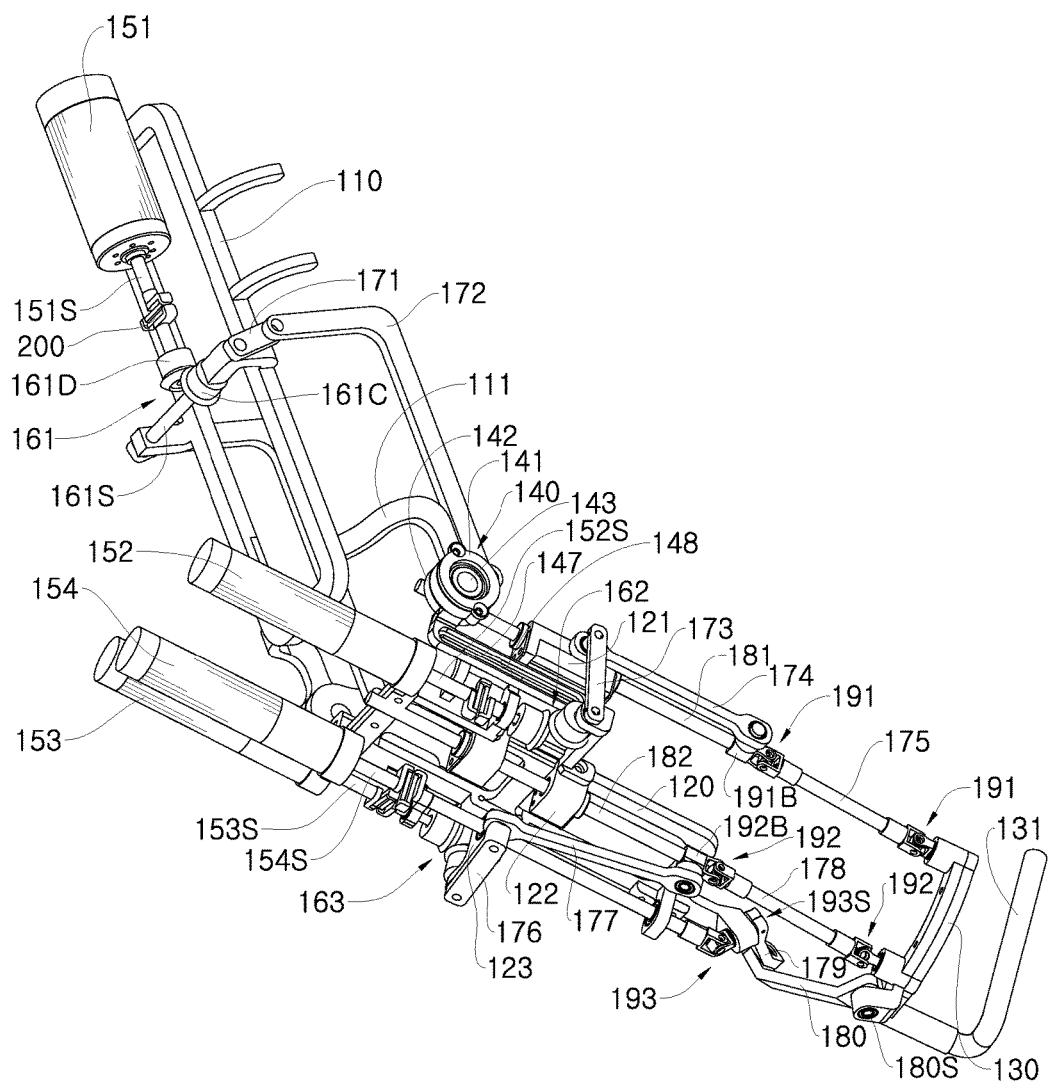
FIG. 2 is a perspective view showing the exoskeleton mechanism of FIG. 1, observed at a different angle.
Figure 3:
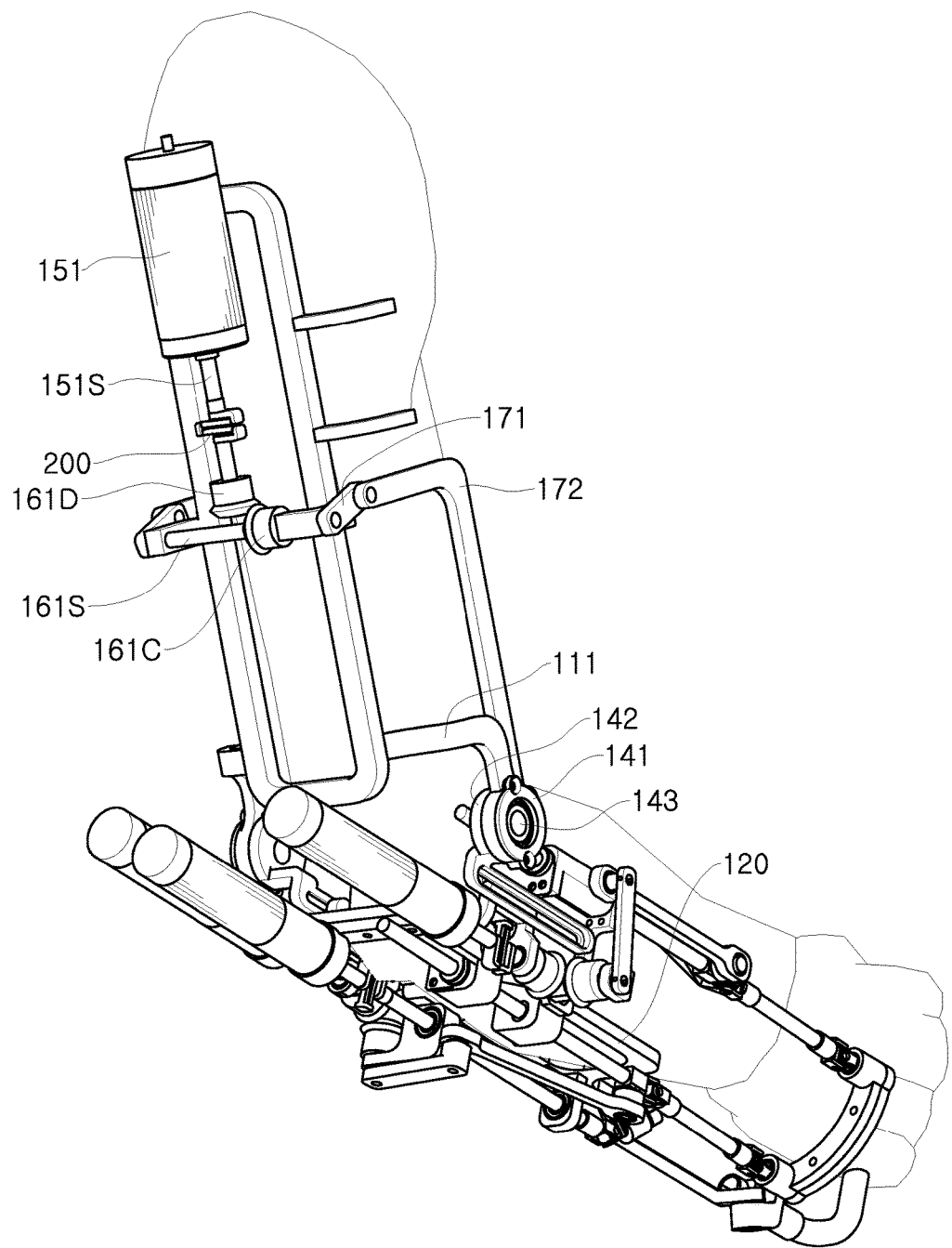
FIGS. 3 to 5 are perspective view for illustrating operations of a first driving motor of the exoskeleton mechanism.
Figure 4:
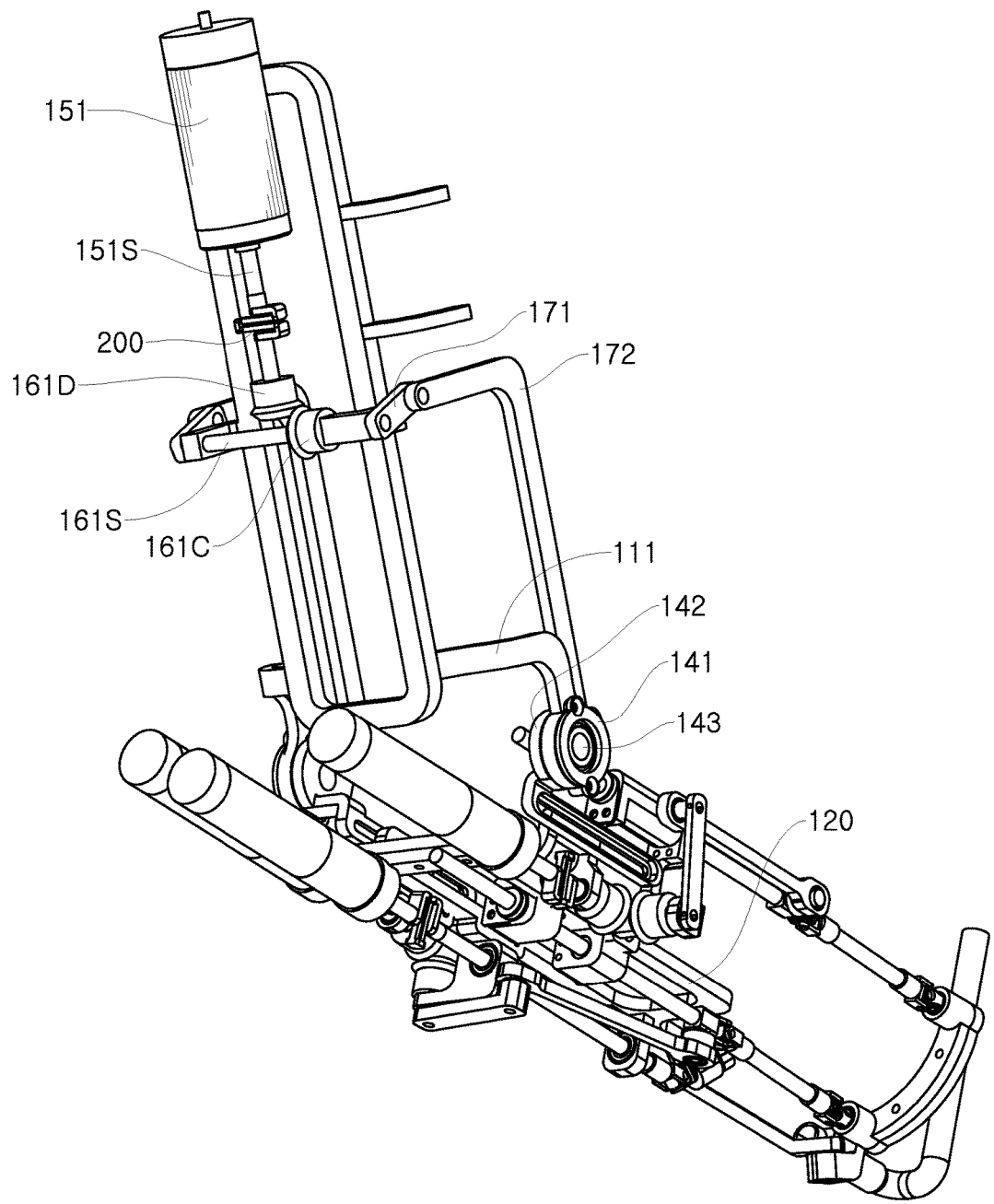
Figure 5:
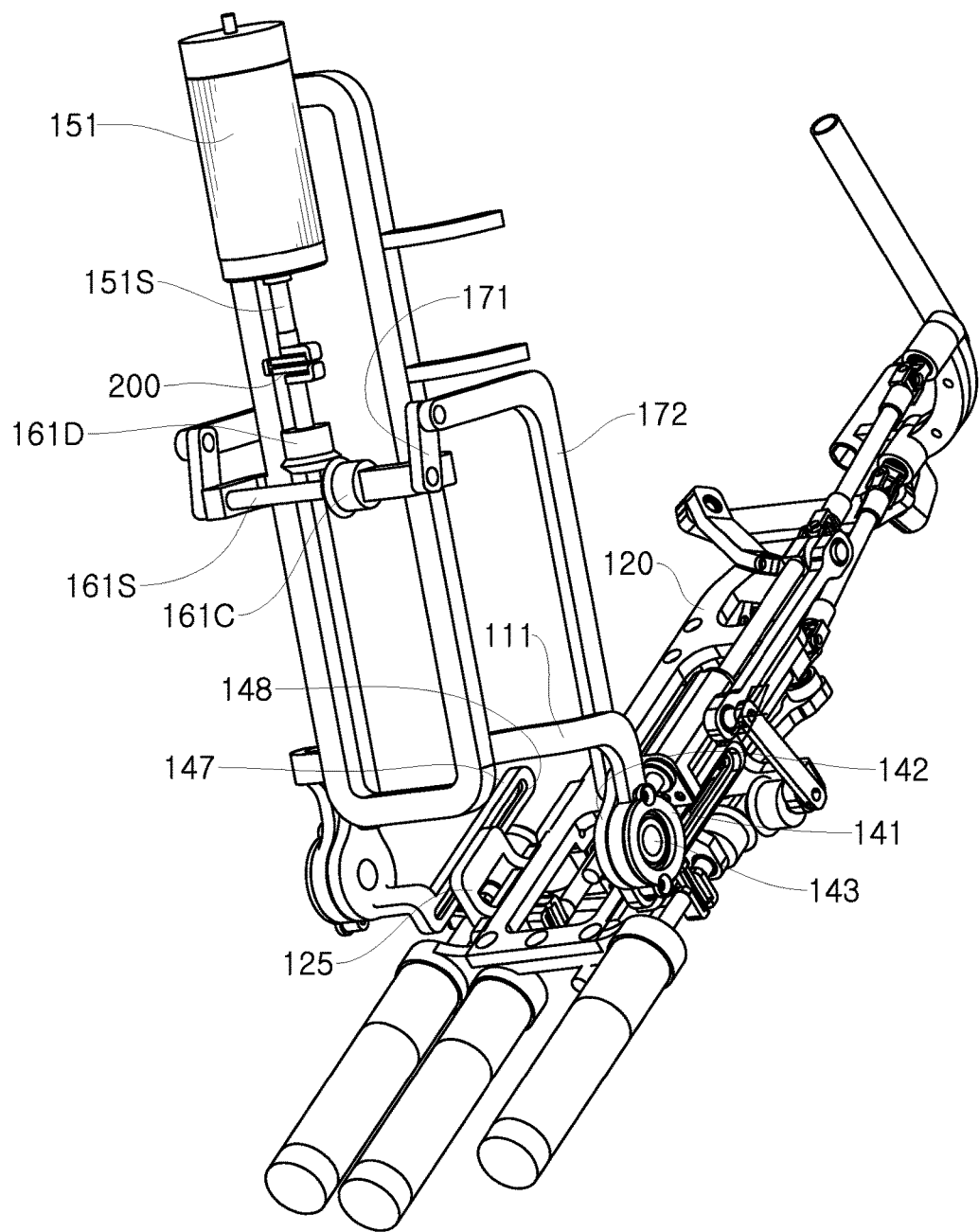
Figure 6:
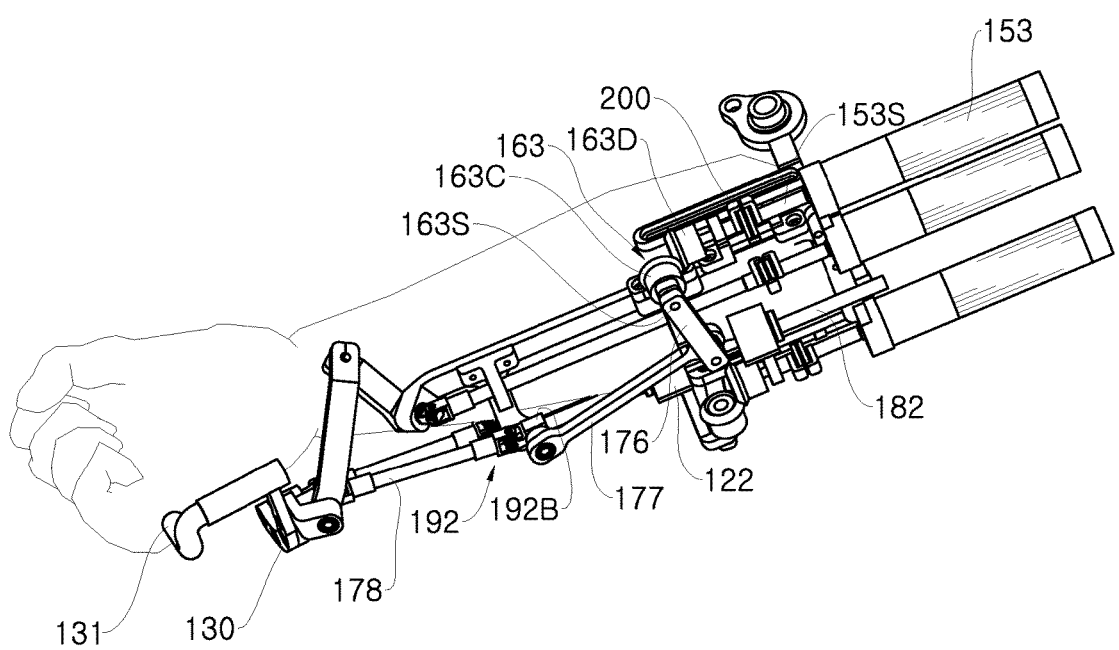
FIGS. 6 to 8 are perspective view for illustrating operations of a second driving motor of the rotatable frame of the exoskeleton mechanism.
Figure 7:
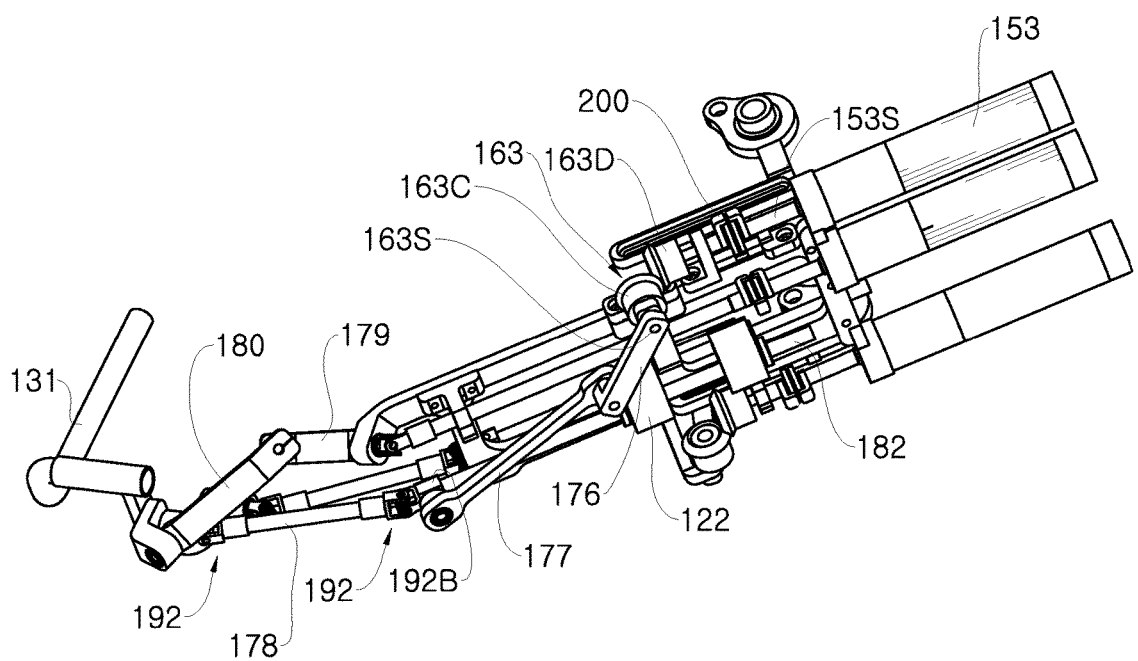
Figure 8:
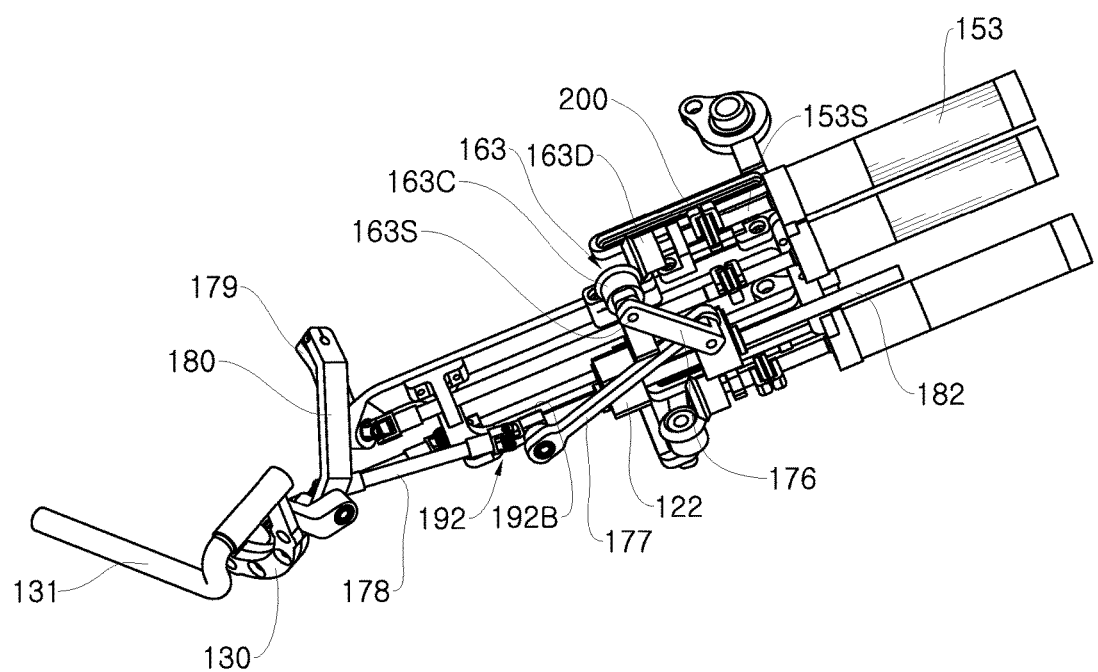
Figure 9:
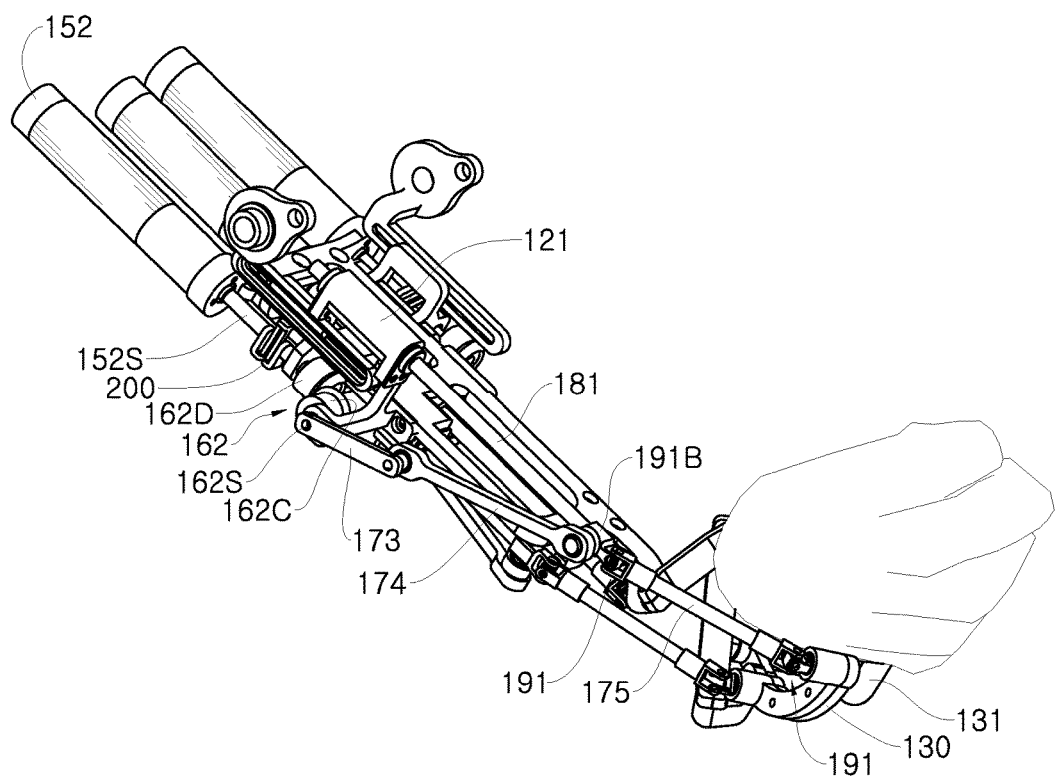
FIGS. 9 to 11 are perspective view for illustrating operations of a first driving motor of the rotatable frame of the exoskeleton mechanism.
Figure 10:
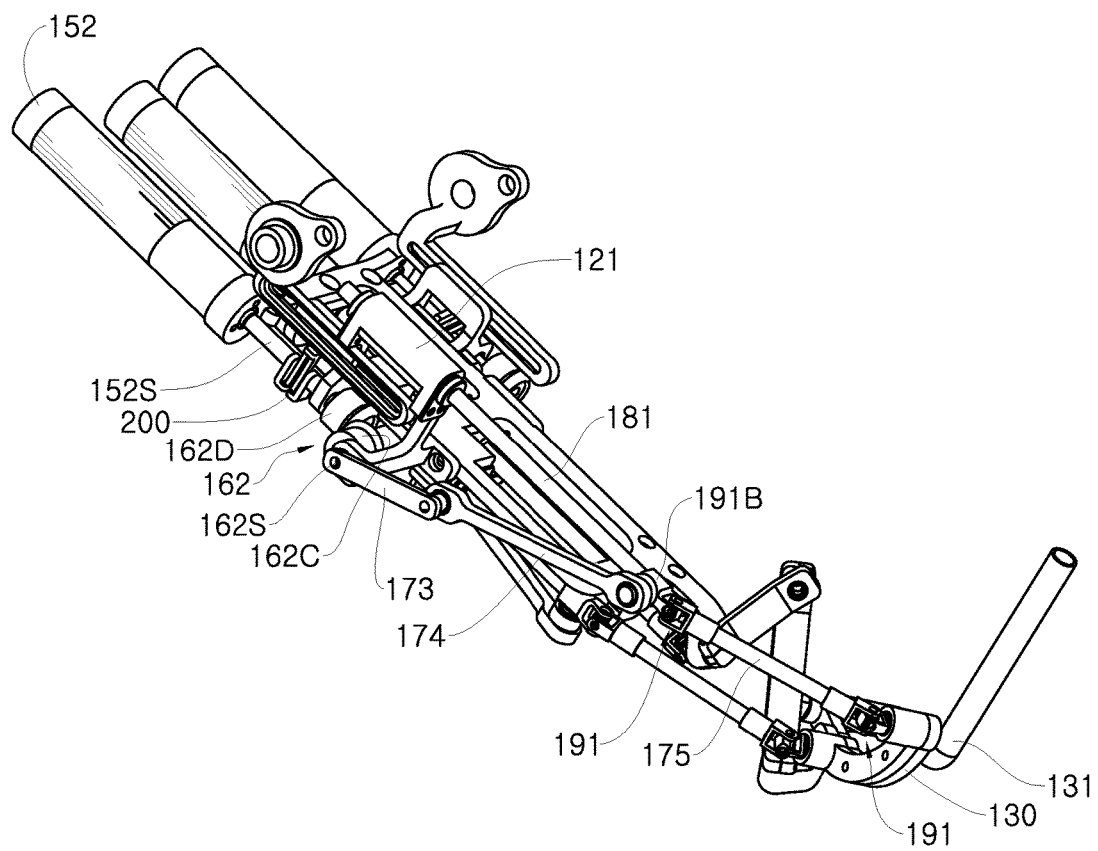
Figure 11:
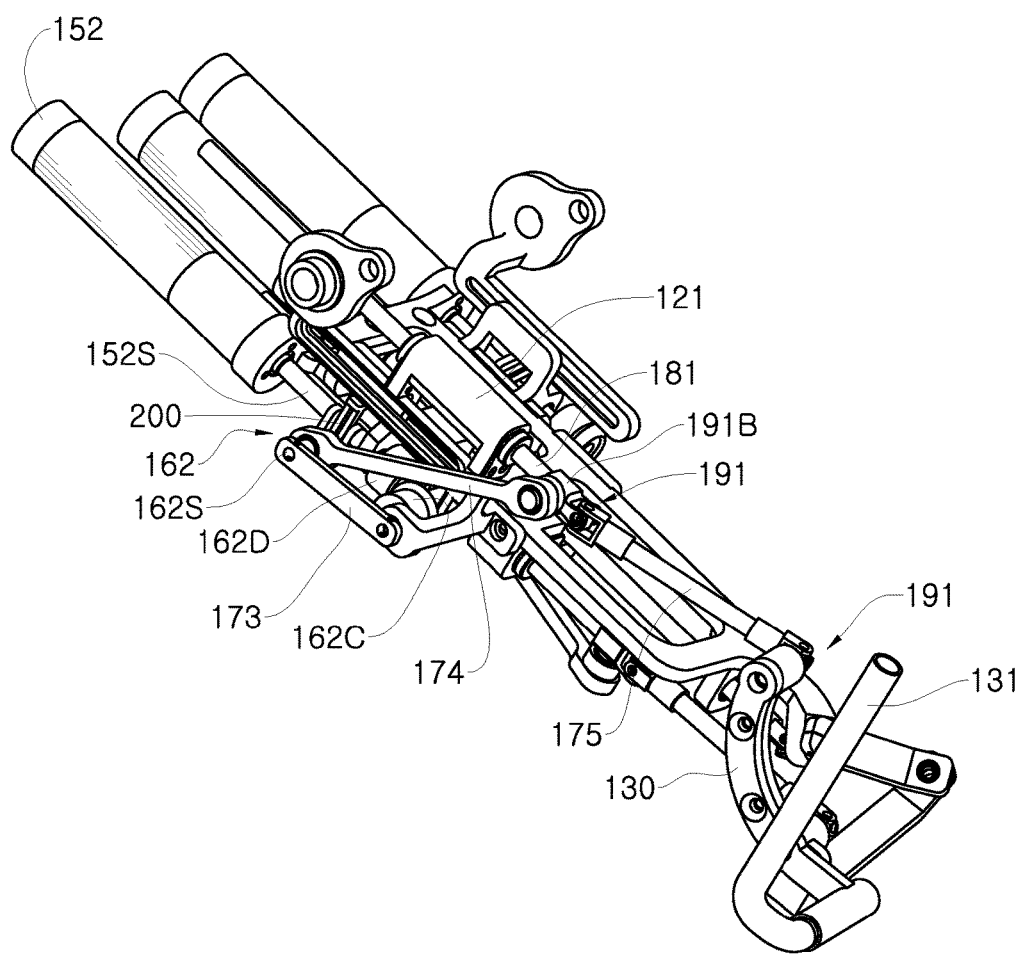
Figure 12:
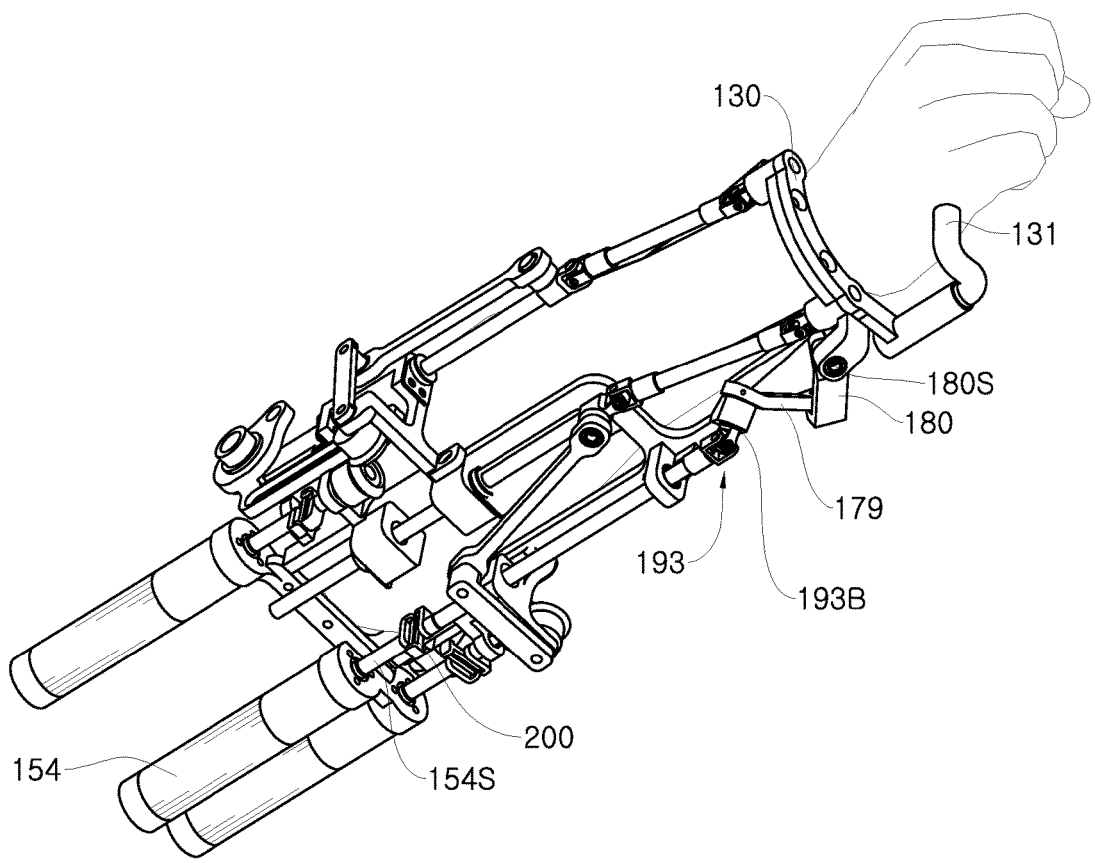
FIGS. 12 to 14 are perspective view for illustrating operations of a third driving motor of the rotatable frame of the exoskeleton mechanism.
Figure 13:
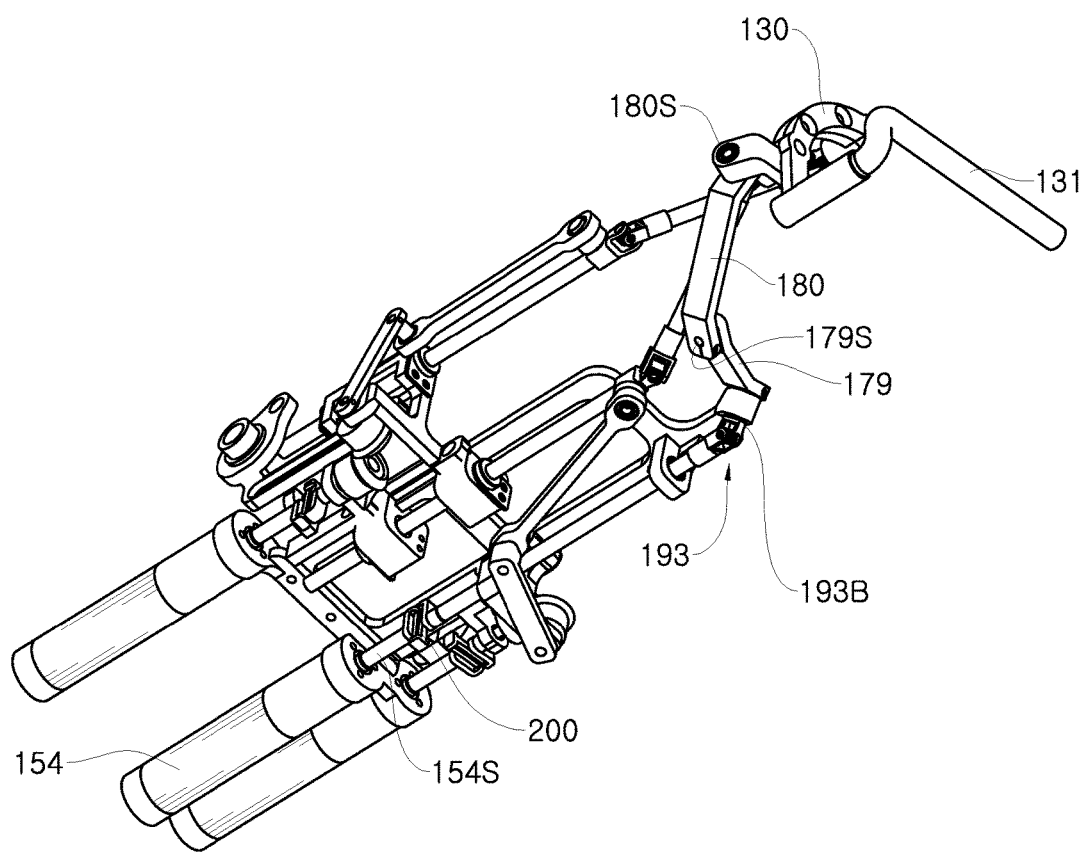
Figure 14:
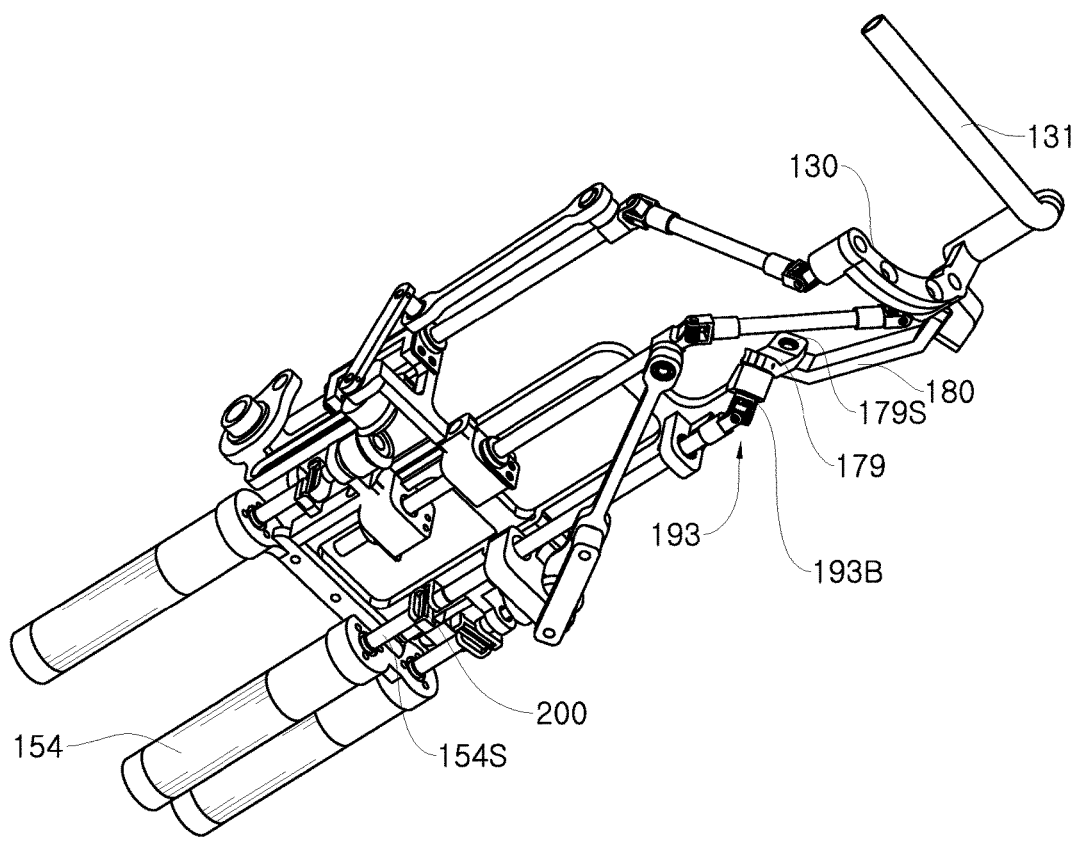
Figure 15:
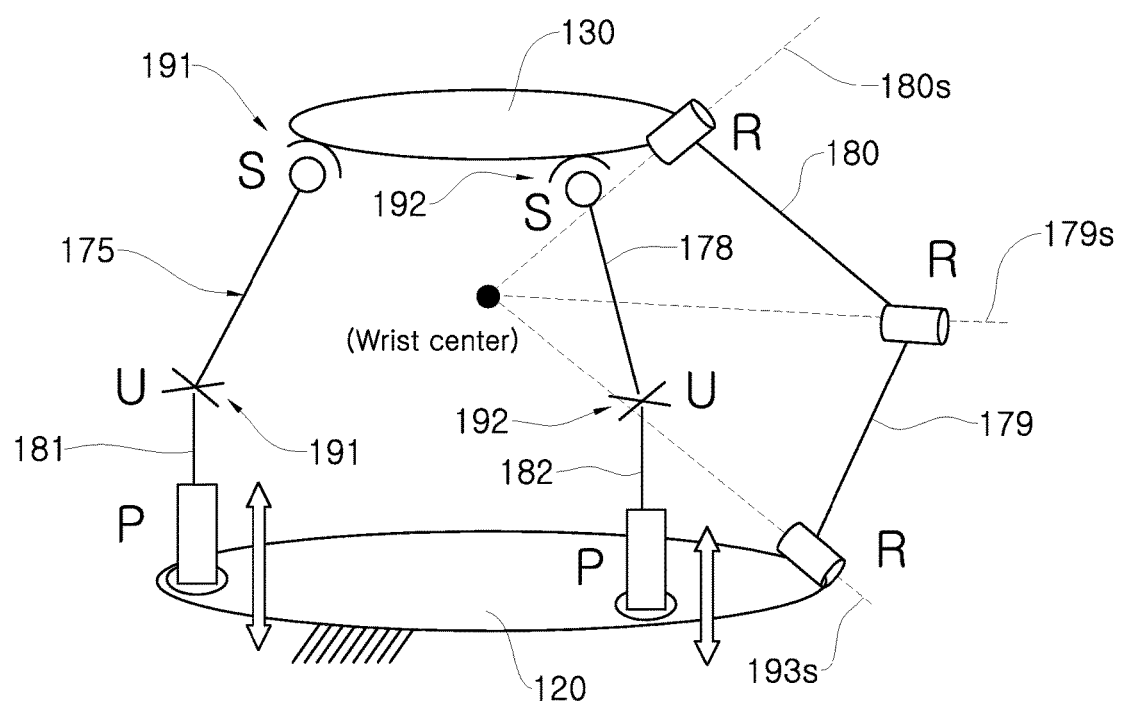
FIG. 15 is a diagram showing an operating mechanism of the exoskeleton mechanism according to the present disclosure.
Figure 16:
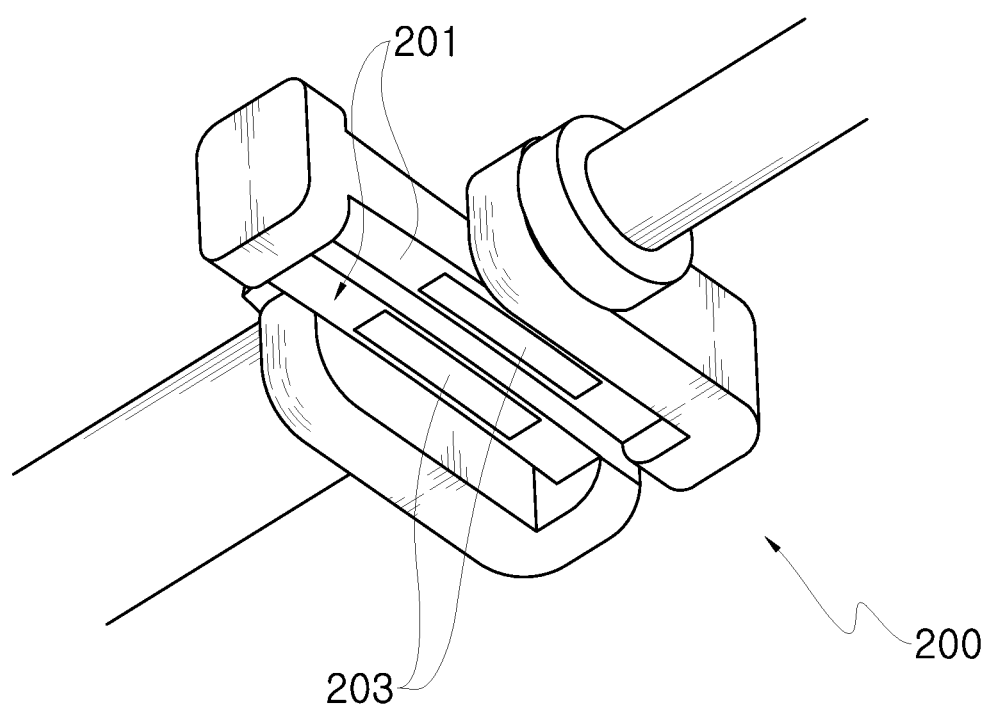
FIG. 16 is a diagram showing an adaptive module mounted to a driving motor.

FIG. 1 is a perspective view showing an exoskeleton mechanism worn by a user according to an embodiment of the present disclosure, FIG. 2 is a perspective view showing the exoskeleton mechanism of FIG. 1, observed at a different angle, FIGS. 3 to 5 are perspective view for illustrating operations of a first driving motor of the exoskeleton mechanism, FIGS. 6 to 8 are perspective view for illustrating operations of a second driving motor of the rotatable frame of the exoskeleton mechanism, FIGS. 9 to 11 are perspective view for illustrating operations of a first driving motor of the rotatable frame of the exoskeleton mechanism, FIGS. 12 to 14 are perspective view for illustrating operations of a third driving motor of the rotatable frame of the exoskeleton mechanism, FIG. 15 is a diagram showing an operating mechanism of the exoskeleton mechanism according to the present disclosure, and FIG. 16 is a diagram showing an adaptive module mounted to a driving motor.

Hereinafter, an exoskeleton mechanism worn on the arm or leg of a human will be described, but the present disclosure is not limited thereto. The exoskeleton mechanism of this embodiment may be installed to the arm or leg of a humanoid robot designed similar to the human. In addition, the robot is not limited to a humanoid robot, and it should be understood that the exoskeleton mechanism of this embodiment may be worn on the arm of any robot which has upper and lower physiques jointed with the single degree of freedom (like the upper arm and the lower arm of a human) and/or a lower physique and a terminal jointed with the three-degree of freedom (like the lower arm and the hand of a human).

If a human wears the exoskeleton mechanism of this embodiment, the exoskeleton may assist the muscular power of the human. If the exoskeleton mechanism is worn by a robot, the robot may exert an additional force further to a designed operation torque.

As shown in FIG. 1, an exoskeleton mechanism 100 includes a fixed frame 110 for supporting an upper arm (humerus portion) 1H, a rotatable frame 120 for supporting a forearm (radius and ulna portion), and a support frame 130 having a grip 131 and coupled to the hand as the grip 131 is gripped by the wearer. Regarding the fixed frame 110 and the rotatable frame 120, the rotatable frame 120 rotates around a hinge unit 140 in the vertical direction (Y axis), and the support frame 130 is connected to the rotatable frame 120 by a plurality of links to be driven to rotate with the three-degree of freedom (X axis, Y axis and roll axis).

Hereinafter, the exoskeleton mechanism configured as above will be described in detail.

As shown in FIG. 2, the fixed frame 110 is positioned to correspond to the upper arm 1H having the humerus, and fixed brackets 111 are bent upwards at both sides of the fixed frame 110 so that the rotatable frame 120 is hinged to the fixed brackets 111. If the upper arm 1H is placed on the fixed frame 110, the upper arm 1H is positioned between the fixed brackets 111, and the elbow is positioned between the fixed frame 110 and the rotatable frame 120, namely to correspond to the hinge unit 140.

The rotatable frame 120 is hinged to the fixed bracket 111 of the fixed frame 110, and the rotatable frame 120 is rotatable in the vertical direction around the fixed frame 110.

The hinge unit 140 includes a first hinge bracket 141 fixed to an end of the fixed bracket 111, and a second hinge bracket 142 corresponding to the first hinge bracket 141 and fixed to the rotatable frame 120. The first hinge bracket 141 and the second hinge bracket 142 are connected by a hinge shaft 143.

A slide bracket 147 having an elongated hole 148 in the length direction of the rotatable frame 120 is formed at the second hinge bracket 142, and a slider 125 fixed to the rotatable frame 120 is inserted into and fixed in the elongated hole 148 of the slide bracket 147. As the slider 125 of the rotatable frame 120 is fixed to the slide bracket 147, a gap between the fixed frame 110 and the rotatable frame 120 is fixed. However, by releasing the fixation of the slider 125 according to the length of the arm of the wearer and moving the slider 125, namely the rotatable frame 120, in the length direction of the elongated hole 148 of the slide bracket 147 to be fixed at another point, the position of the rotatable frame 120 may be changed suitable for a wearer who has a relatively long or short arm. Even through not shown in the figures, holes are formed at intervals in the length direction of the bracket, and bolts are inserted into the holes so that the bolts are screwed to female-thread holes formed in the slider to fix the slider to the slide bracket. In addition, the bolts may be unscrewed to release the fixation, and then the slider may be moved and fixed to another point by inserting bolts into holes at the corresponding point.

A first driving motor 151 of the fixed frame 110 for rotating the rotatable frame 120 is mounted to the bottom surface of the fixed frame 110, and a first bevel gear 161 is fixed to the end of the rotary shaft 151S of the first driving motor 151 positioned parallel to the fixed frame 110. The first bevel gear 161 includes a driving gear 161D fixed to the rotary shaft 151S of the first driving motor 151 and an interlocking gear 161C rotating in engagement with the driving gear 161D. A shaft 161S fixed to the interlocking gear 161C is rotatably mounted to the fixed frame 110, and in this state one end of the first link 171 of the fixed frame 110 is fixed to an end of the shaft 161S. In addition, one end of a L-type second link 172 of the fixed frame 110 is hinged to the other end of the first link 171, and the other end of the second link 172 is hinged to the second hinge bracket 142 fixed to the rotatable frame 120.

Therefore, if the first driving motor 151 of the fixed frame 110 rotates, the shaft 161S of the interlocking gear 161C of the first bevel gear 161 rotates so that the first link 171 rotates around the shaft 161S and the second link 172 of the fixed frame 110 interlocks with the rotation of the first link 171. At this time, as the second hinge bracket 142 hinged to the other end of the second link 172 rotates around the hinge shaft 143, the rotatable frame 120 rotates in the vertical direction.

A first driving motor 152 of the rotatable frame 120 and a second driving motor 153 are respectively mounted to both sides of the bottom surface of the rotatable frame 120.

The rotary shafts 152S, 153S of the first driving motor 152 of the rotatable frame 120 and the second driving motor 153 are positioned parallel to the rotatable frame 120, and a second bevel gear 162 is mounted to the rotary shaft 152S of the first driving motor 152 of the rotatable frame 120. A third bevel gear 163 is mounted to the rotary shaft 153S of the second driving motor 153 of the rotatable frame 120. The second bevel gear 162 and the third bevel gear 163 also include driving gears 162D, 163D fixed to the rotary shafts 152S, 153S, and interlocking gears 162C, 163C rotating in engagement with the driving gears 162D, 163D, respectively. The shafts 162S, 163S fixed to the interlocking gears 162C, 163C are rotatably mounted to the rotatable frame 120, and in this state one ends of links 173, 176 are respectively fixed to the ends of the shafts 162S, 163S. Here, the link fixed to the interlocking gear 162C of the second bevel gear 162 is called a 'first link 173 of the rotatable frame 120', and the link fixed to the interlocking gear 163C of the third bevel gear 163 is called a 'fourth link 176 of the rotatable frame 120'. The first link 173 extends upwards at the side of the rotatable frame 120, and a second link 174 of the rotatable frame 120 extends toward the width center of the rotatable frame 120.

One end of the second link 174 is hinged to the other end of the first link 173, and the second link 174 extends forwards, namely toward the support frame 130 which supports the hand. In addition, one end of a fifth link 177 of the rotatable frame 120 is hinged to the other end of the fourth link 176, and the fifth link 177 extends forwards.

A third link 175 of the rotatable frame 120 is hinged to the other end of the second link 174. The third link 175 is a link having universal joints 191 mounted at both ends thereof, and the universal joint block 191B mounted to one end of the third link 175 is hinged to the other end of the second link 174. In addition, a sixth link 178 of the rotatable frame 120 having universal joints 192 mounted to both ends thereof is coupled to the other end of the fifth link 177, and the other end of the fifth link 177 is hinged to the universal joint block 192B mounted to one end of the sixth link 178.

The second link 174 and the third link 175 are positioned at the side of the rotatable frame 120 in the length direction of the rotatable frame 120, and the fifth link 177 and the sixth link 178 are positioned at bottom surface of the rotatable frame 120 so as to be located in the length direction of the rotatable frame 120 at the width center of the rotatable frame 120.

The universal joint block 191B mounted to the other end of the third link 175 is fixed to the support frame 130, and the universal joint block 192B fixed to the other end of the sixth link 178 is also fixed to the support frame 130.

A first guide bar 181 is fixed to the universal joint block 191B hinged to the second link 174 to extend rearwards, and a second guide bar 182 is fixed to the universal joint block 192B hinged by the fifth link 177 to extend rearwards. In addition, a first holder 121 for supporting the first guide bar 181 to make linear movement is fixed to the side of the rotatable frame 120, and a second holder 122 for supporting the second guide bar 182 to make linear movement is fixed to the bottom surface of the rotatable frame 120.

Therefore, the rotation of the first driving motor 152 of the rotatable frame 120 is transferred to the third link 175 through the first link 173 of the rotatable frame 120 and the second link 174, and at this time the third link 175 makes linear movement by means of the first guide bar 181 and the first holder 121. If the support frame 130 rotates, the third link 175 moves forwards and rearwards along the first guide bar 181 while changing its inclination by means of the universal joints 191 coupled to both ends of the third link 175.

Therefore, the support frame 130 connected to the third link 175 and the sixth link 178 is supported to make not only linear movement forwards and rearwards (the single degree of freedom) by means of the first driving motor 152 of the rotatable frame 120 and the second driving motor 153 but also to make the three-degree of freedom movement by means of the mechanism of the universal joints mounted to both ends of the third link 175 and the sixth link 178.

A third driving motor 154 of the rotatable frame 120 is mounted to the center of the bottom surface of the rotatable frame 120.

The rotary shaft 154S of the third driving motor 154 extends forwards through a third holder 123 fixed to the bottom surface of the rotatable frame 120. A bearing is included in the third holder 123 so as to support the rotary shaft 154S of the third driving motor 154 to rotate smoothly.

A universal joint 193 is mounted to the front end of the rotary shaft 154S of the third driving motor 154, and in a state where the universal joint block 193B is mounted to the front end of the rotatable frame 120, one end of a seventh link 179 of the rotatable frame 120 is fixed to a shaft 193S formed at the universal joint block 193B. One end of an eighth link 180 of the rotatable frame 120 is hinged to the other end of the seventh link 179 to rotate around the hinge shaft 179S, and the other end of the eighth link 180 is hinged to the support frame 130 to rotate around the hinge shaft 180S.

Therefore, if the third driving motor 154 of the rotatable frame 120 is driven, the seventh link 179 rotates by means of the shaft 193S formed at the universal joint block 193B, and the eighth link 180 connected to the seventh link 179 also interlocks so that the support frame 130 rotates. The support frame 130 rolls around the axis (roll axis) direction of the forearm 1L due to the connection between the seventh link 179 and the eighth link 180.

The support frame 130 is curved at a predetermined radius of curvature, and the radius of curvature allows a grip by the hand.

As shown in FIG. 15, extension lines of the shaft 193S of the universal joint block 193B to which one end of the seventh link 179 is mounted, the hinge shaft 179S for connecting the seventh link 179 and the eighth link 180, and the hinge shaft 180S for connecting the eighth link 180 and the support frame 130 meet at one point. This point is a wrist center, and the support frame 130 is also curved around the wrist center.

Therefore, even though the support frame 130 moves by any motor among the first driving motor 152 of the rotatable frame 120, the second driving motor 153 and the third driving motor 154, the support frame 130 moves at the same radius around the wrist center with the three-degree of freedom. Even though the support frame 130 rolls due to the third driving motor 154, the third link 175 and the sixth link 178 are connected to the universal joints 191, 192 to compensate a rotating angle caused by the rotation (rolling) of the support frame 130, and the linear movement of the third link 175 and the sixth link 178 is compensated by the change of inclination of the seventh link 179 and the eighth link 180.

The grip 131 is fixed to the support frame 130, and a user places the arm on the exoskeleton mechanism 100 and then grips the grip 131 by the hand 1F. The user applies a force to move the exoskeleton mechanism 100, or the driving forces of the driving motors 151 to 154 are transferred to the hand through the grip 131.

Adaptive modules 200 are mounted to the rotary shafts 151S, 152S, 153S, 154S of the driving motors 151 to 154.

As shown in FIG. 16, the adaptive module 200 is a flexible hinge, where one ends of two parallel bars 201 parallel to each other are connected, and the other ends of the open parallel bars 201 are connected to the rotary shafts 151S, 152S, 153S, 154S. Therefore, the adaptive module 200 relieves the torsion stress transferred along the rotary shafts 151S, 152S, 153S, 154S and the stress transferred in the length direction. In addition, a strain gauge 203 may be mounted to the adaptive module 200 to obtain a torque applied to each operation from the stiffness of the adaptive module 200, and the force applied to the wrist may be obtained by using a torque of each of the motors 151, 152, 153, 154 and Jacobian of the exoskeleton mechanism.

As an order of obtaining the force applied to the wrist, a bending stress $\epsilon_i$ of each adaptive module is measured, and the bending stress is put into Equation 1 below to calculate a bending rotation $\delta\phi_i$ of each adaptive module.

$$\delta\phi_i = \frac{\beta^2 f(\beta)}{(1+\beta)^{9/20}} \epsilon_i \qquad \text{Equation 1}$$

In Equation 1, β represents t/(2r), t represents a thickness of the hinge, r represents a radius of the hinge, and f is a value calculated by Equation 2 below.

$$f(\beta) \equiv \left(\frac{1}{2\beta+\beta^2}\right)\left\{\left(\frac{3+4\beta+2\beta^2}{(1+\beta)(2\beta+\beta^2)}\right)+ \left(\frac{6(1+\beta)}{(2\beta+\beta^2)^{3/2}}\right)\tan^{-1}\left(\sqrt{\frac{2+\beta}{\beta}}\right)\right\}$$

Equation 2

In addition, the bending moment is $\delta\tau_i$ is calculated by Equation 3 below.

$$\delta\tau_i = k_i \delta\phi_i$$

Equation 3

In Equation 3, $k_i$ represents a rigidity modulus of the corresponding hinge.

In addition, the force $\delta\hat{w}$ applied to the wrist is calculated by Equation 4 below.

$$\delta\hat{w} = J_x^T J_q^{-1} \delta\tau$$

Equation 4

In Equation 4, $J_x$ represents a kinematic Jacobian of a parallel wrist mechanism of the three-degree of freedom, and $J_q$ represents a driving Jacobian of the parallel wrist mechanism of the three-degree of freedom.

As described above, the force applied to the wrist may be calculated by measuring the bending stress applied to the adaptive module 200, and so the operation of the exoskeleton mechanism 100 may be easily controlled according to the state of the wearer.

Hereinafter, the operations of the exoskeleton mechanism configured as above will be described.

If a wearer places the arm on the exoskeleton mechanism 100, the upper arm 1H is placed on the fixed frame 110, and the forearm 1L is placed on the rotatable frame 120. At this time, the upper arm 1H is positioned between both second links 172, the third link 175 is positioned at the side of the forearm 1L in the length direction of the forearm 1L, and the sixth link 178 is positioned below the forearm 1L.

In this state, if the first driving motor 151 of the fixed frame 110 is operated, as shown in FIGS. 3 to 5, the first link 171 of the fixed frame 110 rotates by means of the rotary shaft 151S of the first driving motor 151, and the interlocking second link 172 of the fixed frame 110 rotates the first hinge bracket 141 so that the rotatable frame 120 fixed to the first hinge bracket 141 rotates in the vertical direction (Y axis) around the hinge shaft 143 of the hinge unit 140.

If the second driving motor 153 of the rotatable frame 120 is operated in a state where the arm is placed on the exoskeleton mechanism 100 and the grip 131 is gripped by the hand, as shown in FIGS. 6 to 8, the fourth link 176 rotates by means of the second driving motor 153, and the interlocking fifth link 177 moves so that the second guide bar 182 moves forwards and rearwards. At this time, the sixth link 178 connected to the universal joint 192 changes its inclination due to the vertical movement (Y-axis direction) of the support frame 130. In addition, the third link 175 connected to the support frame 130 also changes its inclination due to the vertical movement of the support frame 130, but the first guide bar 181 connected to the third link 175 does not move forwards and rearwards.

If the first driving motor 152 of the rotatable frame 120 is operated, as shown in FIGS. 9 to 11, the first link 173 of the rotatable frame 120 rotates, and the interlocking second link 174 moves so that the first guide bar 181 moves forwards and rearwards. At this time, the third link 175 connected to the universal joint 191 changes its inclination by means of the horizontal movement (X-axis direction) of the support frame 130. In addition, the sixth link 178 connected to the support frame 130 also changes its inclination due to the horizontal movement of the support frame 130, but the second guide bar 182 connected to the sixth link 178 does not move forwards and rearwards.

If the third driving motor 154 of the rotatable frame 120 is operated, as shown in FIGS. 12 to 14, the seventh link 179 rotates, and the interlocking eighth link 180 moves so that the support frame 130 rotates around the axis (roll axis) of the forearm 1L. At this time, the third link 175 and the sixth link 178 change their inclinations due to the rotation of the support frame 130, but the first guide bar 181 connected to the third link 175 and the second guide bar 182 connected to the sixth link 178 do not move forwards and rearwards.

As described above, the first driving motor 151 of the fixed frame 110 rotates the rotatable frame 120 around the hinge unit 140 corresponding to the elbow so that the forearm 1L moves in the vertical direction. The first driving motor 152 of the rotatable frame 120 moves the support frame 130 in the horizontal direction so that the wrist moves in the horizontal direction. The second driving motor 153 moves the support frame 130 in the vertical direction so that the wrist moves in the horizontal direction. The third driving motor 154 of the rotatable frame 120 rotates the support frame 130 around the roll axis and allows the hand 1F and the forearm 1L to be twisted.

In the exoskeleton mechanism 100 configured as above, the first driving motor 151 is positioned in the length direction at the bottom surface of the fixed frame 110, and the driving motors 152 to 154 are positioned in the length direction at the bottom surface of the rotatable frame 120, so that four driving motors 151, 152, 153, 154 are positioned in the length direction of the arm. Therefore, the width of the exoskeleton mechanism 100 may be reduced to avoid disturbance to the wearer.

In addition, the adaptive module 200 is respectively mounted to the rotary shafts 151S, 152S, 153S, 154S of the driving motors 151, 152, 153, 154 to relieve an excessive force, and the transferred force may be measured by the strain gauge 203 mounted to the adaptive module 200.

Even though the exoskeleton mechanism 100 according to the present disclosure has been described as being mounted to the arm, this may also be used as an exoskeleton mechanism for the leg of a wearer if the grip 131 is modified. In detail, a Velcro, a band, a hook or the like may be mounted instead of the grip so that the foot placed on the support frame 130 is fixed by the Velcro, the hand, the hook or the like. At this time, the fixed frame 110 is positioned to correspond to the front of the thigh (femur), and the rotatable frame 120 is positioned to correspond to the front of the cnemis. In the exoskeleton mechanism 100 configured as above, the cnemis rotates around the knee by means of the first driving motor 151, and the foot rotates around the ankle with the three-degree of freedom by means of the driving motors 152 to 154.

In addition, even though the exoskeleton mechanism 100 according to the present disclosure has been described as being configured with the fixed frame 110, the rotatable frame 120 and the support frame 130, on occasions, the fixed frame 110 and the rotatable frame 120 may be connected by the hinge unit 140 to configure an exoskeleton mechanism where the rotatable frame 120 rotates in the vertical direction by means of the first driving motor 151, or the rotatable frame 120 and the support frame 130 may be connected by the links 173 to 180 to configure an exoskeleton mechanism where the support frame 130 is driven by the motors 152 to 154 to make movement with the three-degree of freedom.

In addition, in the exoskeleton mechanism 100 according to the present disclosure as described above, the first bevel gear 161, the second bevel gear 162 and the third bevel gear 163 are rotating power transmission units between inclined shafts ("inclined shafts" refers to the non-parallel shafts that are mechanically connected by corresponding bevel gears. For example, rotary shaft 151S and shaft 161S about bevel gear 161, may be referred to collectively as inclined shafts), where the bevel gear may be replaced with other kinds of gears, and the universal joints 191, 192, 193 mounted to both ends of the third link 175 and the sixth link 178 may be replaced with ball joints which are rotating joints having at least two degree of freedom.

While the exemplary embodiments have been shown and described, it will be understood by those skilled in the art that various changes in form and details may be made thereto without departing from the spirit and scope of the present disclosure as defined by the appended claims.

What is claimed is:

1. An exoskeleton mechanism configured to be coupled to a lower physique and having a jointed terminal end with three-degrees of freedom, comprising:
    a rotatable frame positioned to correspond to the lower physique;
    a support frame coupled to the jointed terminal end;
    motors mounted to the rotatable frame, protruding from an end of the rotatable frame in a lengthwise direction of the rotatable frame, connected to the support frame, and configured to drive the support frame to rotate in a vertical direction, in a horizontal direction, and around a roll axis of the lower physique; and
    links, each comprising a rigid shaft, that connect the motors and the support frame,
    wherein the support frame rotates with respect to the rotatable frame with three-degrees of freedom by relative rotation of links connected in series from each motors to the support frame, wherein the motors comprise a first motor configured to drive the support frame to rotate in the horizontal direction, a second motor configured to drive the support frame to rotate in the vertical direction, and a third motor configured to drive the support frame to rotate around the roll axis, wherein a rotary shaft of the first motor, a rotary shaft of the second motor, and a rotary shaft of the third motor are respectively positioned in a lengthwise direction of the rotatable frame, wherein each of the rotary shaft of the first motor, the rotary shaft of the second motor, and the rotary shaft of the third motor comprises a flexible hinge mounted thereon, and wherein each flexible hinge serves as an adaptive module to release torsion stress respectively transferred along either the rotary shaft of the first motor, the rotary shaft of the second motor, or the rotary shaft of the third motor.

2. The exoskeleton mechanism according to claim 1, further comprising:
    a driving gear of a rotating power transmission unit, wherein the driving gear is positioned between inclined shafts and mounted to the rotary shaft of the first motor;
    a first link of the links fixed to a shaft of an interlocking gear interlocked with the driving gear;
    an end of a second link of the links hinged to an end of the first link; and
    rotating joints mounted to both ends of a third link of the links,
    wherein another end of the second link is hinged to a block of one rotating joint of the third link, and a block of another rotating joint of the third link is fixed to the support frame.

3. The exoskeleton mechanism according to claim 2, wherein:
    a first guide bar is fixed to the block of the rotating joint hinged to the other end of the second link in a lengthwise direction of the rotatable frame; and
    the first guide bar is inserted into a first holder fixed to the rotatable frame to allow for linear movement of the first guide bar.

4. The exoskeleton mechanism according to claim 1, wherein:
    a driving gear of a rotating power transmission unit between third inclined shafts is mounted to the rotary shaft of the second motor; a fourth link of the links is fixed to a shaft of an interlocking gear interlocked with the driving gear;
    an end of a fifth link of the links is hinged to an end of the fourth link; rotating joints are mounted to both corresponding ends of an sixth link of the links;
    the other end of the fifth link is hinged to a block of one rotating joint of the sixth link; and
    a block of another rotating joint of the sixth link of the links is fixed to the support frame.

5. The exoskeleton mechanism according to claim 4, wherein:
    a second guide bar is fixed to the block of the rotating joint hinged to the other end of the fifth link in a lengthwise direction of the rotatable frame; and
    the second guide bar is inserted into a second holder fixed to the rotatable frame to make linear movement.

6. The exoskeleton mechanism according to claim 1, wherein:
    a rotating joint is mounted to an end of the third motor; one end of a seventh link is fixed to a block of the rotating joint; one end of an eighth link is hinged to another end of the seventh link; and
    another end of the eighth link is hinged to the support frame.

7. The exoskeleton mechanism according to claim 6, further comprising:
    a shaft formed at the block of the rotating joint,
    wherein the one end of the seventh link is fixed to the shaft formed at the block of the rotating joint, and
    wherein an extension line of the shaft, and an extension line of a hinge shaft connecting the seventh link and the eighth link, and an extension line of a hinge shaft connecting the eighth link and the support frame meet at one point.

8. The exoskeleton mechanism according to claim 7, wherein the support frame is curved around the one point.

9. The exoskeleton mechanism according to claim 1, wherein a grip is mounted to the support frame so that the grip is configured to be gripped by a hand at a terminal end of a limb.

10. The exoskeleton mechanism according to claim 1, wherein a fixing means is mounted to the support frame so that a foot is configured to be fixed by the fixing means.

11. The exoskeleton mechanism according to claim 1, further comprising:
    strain gauges mounted to the flexible hinges and configured to measure a stress applied to the flexible hinges.

12. An exoskeleton mechanism configured to be coupled to an upper physique and a lower physique, the upper and lower physiques sharing a joint with a single degree of linear freedom, and coupled to the lower physique, the lower physique having a jointed terminal end with three degrees of freedom, the exoskeleton mechanism comprising:
- a fixed frame positioned to correspond to the upper physique;
- a rotatable frame positioned to correspond to the lower physique and coupled to the fixed frame by a hinge unit to be rotatable in a vertical direction;
- a support frame coupled to the jointed terminal end;
- a first motor mounted to the fixed frame and connected to the rotatable frame to drive the rotatable frame to rotate in the vertical direction;
- motors mounted to the rotatable frame, protruding from an end of the rotatable frame in a lengthwise direction of the rotatable frame, and connected to the support frame to drive the support frame to rotate in the vertical direction and in a horizontal direction and rotate around a roll axis of the lower physique;
- links, each comprising a rigid shaft, that connect the first motor and the rotatable frame; and
- links, each comprising a rigid shaft, that connect the motors and the support frame, wherein the support frame rotates with respect to the rotatable frame with three-degrees of freedom by relative rotation of links connected in series from each motors to the support frame, wherein the motors comprise a first motor configured to drive the support frame to rotate in the horizontal direction, a second motor configured to drive the support frame to rotate in the vertical direction, and a third motor configured to drive the support frame to rotate around the roll axis, wherein a rotary shaft of the first motor, a rotary shaft of the second motor, and a rotary shaft of the third motor are respectively positioned in a lengthwise direction of the rotatable frame, wherein each of the rotary shaft of the first motor, the rotary shaft of the second motor, and the rotary shaft of the third motor comprises a flexible hinge mounted thereon, and wherein each flexible hinge serves as an adaptive module to release torsion stress respectively transferred along either the rotary shaft of the first motor, the rotary shaft of the second motor, or the rotary shaft of the third motor.

\* \* \* \* \*